Aug. 1, 1967  R. C. MAZUREK ET AL  3,333,929
CLARIFICATION AND CONCENTRATION OF WET PROCESS PHOSPHORIC ACID
Filed April 4, 1966

INVENTORS:
ROBERT C. MAZUREK
JOSEPH S. McCLURE
BY: Carl C. Batz
ATT'Y

3,333,929
CLARIFICATION AND CONCENTRATION OF WET PROCESS PHOSPHORIC ACID
Robert C. Mazurek and Joseph S. McClure, Lakeland, Fla., assignors to Armour Agricultural Chemical Company, Chicago, Ill., a corporation of Delaware
Filed Apr. 4, 1966, Ser. No. 539,838
3 Claims. (Cl. 23—305)

This invention relates to the clarification and concentration of wet process phosphoric acid.

In the concentration of wet process phosphoric acid, solids are formed which form a sludge in the product. Such solids usually consist of gypsum, gypsum anhydrite, iron and aluminum phosphates, and fluoride compounds. Iron phosphates constitute a large portion of the impurities, and normally exist as a complex phosphate $Fe(PO_4) \cdot H_3PO_4$. While impurities may be crystallized by cooling the wet process phosphoric acid after concentration, and some crystals removed in conventional separating equipment, the iron phosphate impurities, upon cooling, form small, fragile, hexagonal, plate-like crystals which are difficult to remove.

By seeding the wet process phosphoric acid prior to concentration or while it is undergoing concentration with additional iron phosphate to bring the concentrated acid preferably within the range of about 3.4–4.2%, the cooled acid forms crystals of a size which can be removed to a substantial extent by centrifuging. We have discovered that the output of the process can be greatly increased by providing an arrangement of centrifuge apparatus and specific centrifuge apparatus which will be effective in removing crystals whereby a clarified product containing solids of less than 10 microns in average size is obtained while at the same time recycling to the concentrator a fraction containing the solids of about 10 microns size and higher. The recycled fraction containing the very fine solids in addition to larger solids is advantageous because the fine solids are effective in the seeding operation, providing a large amount of nuclei and the same produce crystals in the crystal growth cooling stage.

A primary object, therefore, of the invention is to provide a process for clarifying and concentrating wet process phosphoric acid through selective seeding of the acid prior to concentration with fine iron phosphate crystals while providing a product containing a minimum of solids. Another object is to provide apparatus in which centrifuge mechanism is arranged for the removal of solids of less than 10 micron average size. A further object is to provide an arrangement of centrifuges in tandem following the aging discharge for the effective removal of solids. Other specific objects and advantages will appear as the specification proceeds.

Figure 1:
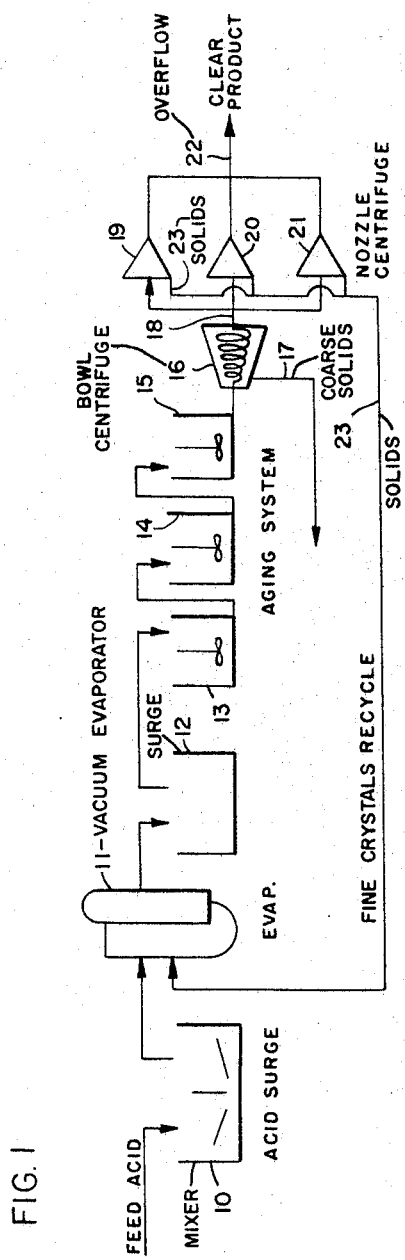

The invention is shown in an illustrative embodiment in the following drawing, in which FIGURE 1 is a diagrammatic layout of the process and equipment employed in the use of our invention; and FIG. 2, a broken, part-sectional view of a nozzle centrifuge which is employed in the practice of our invention.

In one embodiment of our invention, the process may be carried out as diagrammatically shown in FIG. 1 of the drawing. Feed acid, such as, for example, 30% $P_2O_5$ wet process acid, is introduced into a mixer tank 10 which is generally referred to as an acid surge, and from the tank the acid is introduced into a conventional evaporator 11 which is preferably a vacuum type evaporator. From the evaporator the concentrated acid which, for example, may be concentrated to about 54% $P_2O_5$ phosphoric acid, enters a surge tank 12 and from tank 12 the acid is passed into cooling or aging tanks 13, 14 and 15 and gently agitated to keep the solids in suspension. In the aging tanks 13, 14 and 15, the crystals are allowed to grow over a period of preferably 12 to 18 hours or more.

The acid from the aging tanks is then passed through a bowl centrifuge 16, the underflow containing the solids being withdrawn through line 17 and passed to an ammonium equipment where it may be ammoniated to form a fertilizer product. The overflow containing the clarified product is passed through line 18 to a single or several nozzle centrifuges 19, 20 and 21. The clarified product from the nozzle centrifuge or centrifuges is withdrawn through line 22 as a final product. The underflow from the nozzle centrifuge or centrifuges is recycled at least in part through line 23 to the concentrator 11. If desired, a portion of the underflow withdrawn through line 23 from the nozzle centrifuge or centrifuges may be sent to ammoniation equipment along with the material in line 17. In any event, the recycled material through line 23 is proportioned so as to bring the iron phosphate content of the concentrated acid leaving the evaporator 11 into the range of about 3.4–6.0% (preferably 3.6–4.2%). Such a range has been found desirable for the growth of crystals in the aging tanks 13, 14 and 15.

After concentration, which is preferably carried out under vacuum at about 170–190° F., the acid is preferably cooled and held at a desirable aging temperature to bring about effective growth and additional neucleation of the crystals. While we have shown aging tanks held at about 100° F., it will be understood that temperatures employed during aging may vary widely as, for example, between about 100° and 200° F., and the period of holding at the desired temperature for crystal growth may extend for a day or more or for periods as low as six and twelve hours.

We have discovered that the nozzle centrifuge is most effective in removing fine solids, for example, solids less than 10 microns in average size, and its use in conjunction with the process is particularly effective in supplying a larger amount of fine seed in the proportion returned to the concentrator 11. Further, the product has a higher degree of clarification in that it contains solids less than 10 microns in average size.

If desired, the solid bowl centrifuge may be omitted. There is, however, some advantage in that prior to the use of the nozzle centrifuges a substantial portion of the solids can be removed in a fraction for sending to the ammoniation equipment. Further, it is found that the nozzle centrifuge functions more effectively as a follow-up for the solid bowl centrifuge and in removing solids to an extremely low size.

The bowl centrifuge 16 is critical in its use for the removal of the particular type of solids. A typical solids bowl centrifuge is capable of producing up to 3,000 g's (gravity forces). For the removal of gypsum and silicofluoride, we prefer to use up to about 3,000 g's. For the removal of iron phosphates, we find that the gravity forces should be in the neighborhood of 1000–1500 g's.

With respect to the operation of the nozzle centrifuge or centrifuges, the solid separation is effective for all of the solids, the centrifuge being particularly effective in removing solids less than 10 microns in average size.

Figure 2:
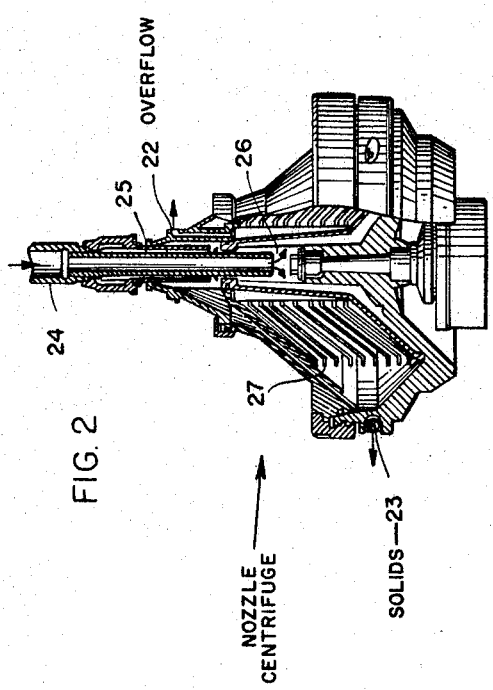

A typical nozzle centrifuge is illustrated in FIG. 2. The feed, either from tank 15, or, if the solid bowl centrifuge 16 is employed, from the overflow line 18, enters the nozzle centrifuge through inlet 24 and runs through the feed tube 25 into the distributor 26 and thence over the discs 27. The greater portion of the liquid flows over the discs toward the center and is discharged as overflow through outlet 22, while the solids are thrown out toward the periphery of the bowl, leaving through the underflow outlet through recycle line 23. By locating the nozzle centrifuge or centrifuges at the end of the system following the aging discharge, it is found that the apparatus is most effective for removing the very fine solids.

Specific examples illustrative of the invention may be set out as follows:

Example I

Demonstration tests employing iron phosphate seeding were carried out in a plant. The feed acid consisted of 834 tons having a $P_2O_5$ content of 30% and an iron phosphate content of 1.9%. To the feed acid was added 7.0 tons of recycled underflow from the nozzle centrifuge, as shown in the drawing. The evaporated acid had a $P_2O_5$ content of 54%. The overflow recovery was 75% and the total solids in the final clarified and centrifuged product was 1%.

Example II

Tests were carried out as described in Example I, the operation, however, being carried through the evaporation, clarification and centrifuging stages under the conditions and with the results indicated in Table I:

Table I

|  | G.p.m. | Total Tons/Hr. | Percent Solids | Tons/Hr. Solids |
|---|---|---|---|---|
| Bowl Feed | 54 | 23 | 8 | 1.84 |
| Bowl Overflow | 49 | 21 | 4 | 0.84 |
| Bowl Underflow | 5 | 1.25 | 80 | 1.0 |
| Nozzle Feed | 49 | 21 | 4 | 0.84 |
| Nozzle Underflow | 7.7 | 3.3 | 20 | 0.66 |
| Nozzle Overflow | 41.3 | 17.7 | 1 | 0.18 |

In the above table, "g.p.m." in the first column indicates gallons per minute, the second column indicates the total tons per hour of solids, the third column shows the percent of solids on a dry basis, and the fourth column the actual tons per hour of solids material.

While in the foregoing specifications we have set out a specific operation and specific apparatus in considerable detail for the purpose of illustrating embodiments of the invention, it will be understood that such detail or details may be varied widely by those skilled in the art without departing from the spirit of our invention.

We claim:

1. A process for clarifying and concentrating wet process phosphoric acid containing iron phosphate and other solids and in which the acid is concentrated by heat evaporation, the concentrated acid being cooled and centrifuged to remove crystals, characterized in that a portion of the centrifuged acid containing solids of less than 10 microns in average size is withdrawn as product and a fraction containing solids of 10 microns size and larger is recycled and mixed with the acid being fed to the evaporator, said recycled acid containing iron phosphates in an amount sufficient to bring the iron phosphate content of the concentrated acid into the range of about 3.4–6.0%.

2. The process of claim 1 in which the recycled acid contains iron phosphates in an amount sufficient to bring the iron phosphate content of the concentrated acid into the range of 3.6–4.2%.

3. In a process for clarifying and concentrating wet process phosphoric acid containing iron phosphate and other solids and in which the acid is concentrated by heat evaporation and the concentrated acid cooled and centrifuged to remove crystals, the steps of passing the cooled acid-containing crystals through a solid bowl centrifuge, removing a coarse solids product, passing the overflow from said centrifuge containing fine solids through a nozzle centrifuge, withdrawing a clarified product containing solids of less than 10 microns in average size, and recycling a portion of the overflow containing solids of 10 microns size and larger to the heat evaporator system.

References Cited

UNITED STATES PATENTS

| 2,347,073 | 4/1944 | Beekhuis | 23—301 |
| 2,602,023 | 7/1952 | Simms | 23—301 |
| 2,608,465 | 8/1952 | May | 23—165 X |
| 2,888,449 | 5/1959 | Borck | 260—112 |
| 3,216,481 | 11/1965 | Henze | 159—47 |

FOREIGN PATENTS

| 1,135,905 | 5/1957 | France. |
| 1,364,200 | 5/1964 | France. |

NORMAN YUDKOFF, *Primary Examiner.*

WILBUR L. BASCOMB, JR., J. SOFER,
                *Assistant Examiners.*